March 29, 1927.

E. C. PETERSON 1,622,839

VEHICLE LOCK

Original Filed June 9, 1922   4 Sheets-Sheet 1

Inventor
Elmer C. Peterson

March 29, 1927.  1,622,839
E. C. PETERSON
VEHICLE LOCK
Original Filed June 9, 1922    4 Sheets-Sheet 2

Inventor
Elmer C. Peterson
By Lancaster Allwine
Attorneys

March 29, 1927.

E. C. PETERSON

VEHICLE LOCK 1,622,839

Original Filed June 9, 1922    4 Sheets-Sheet 3

Inventor
Elmer C. Peterson

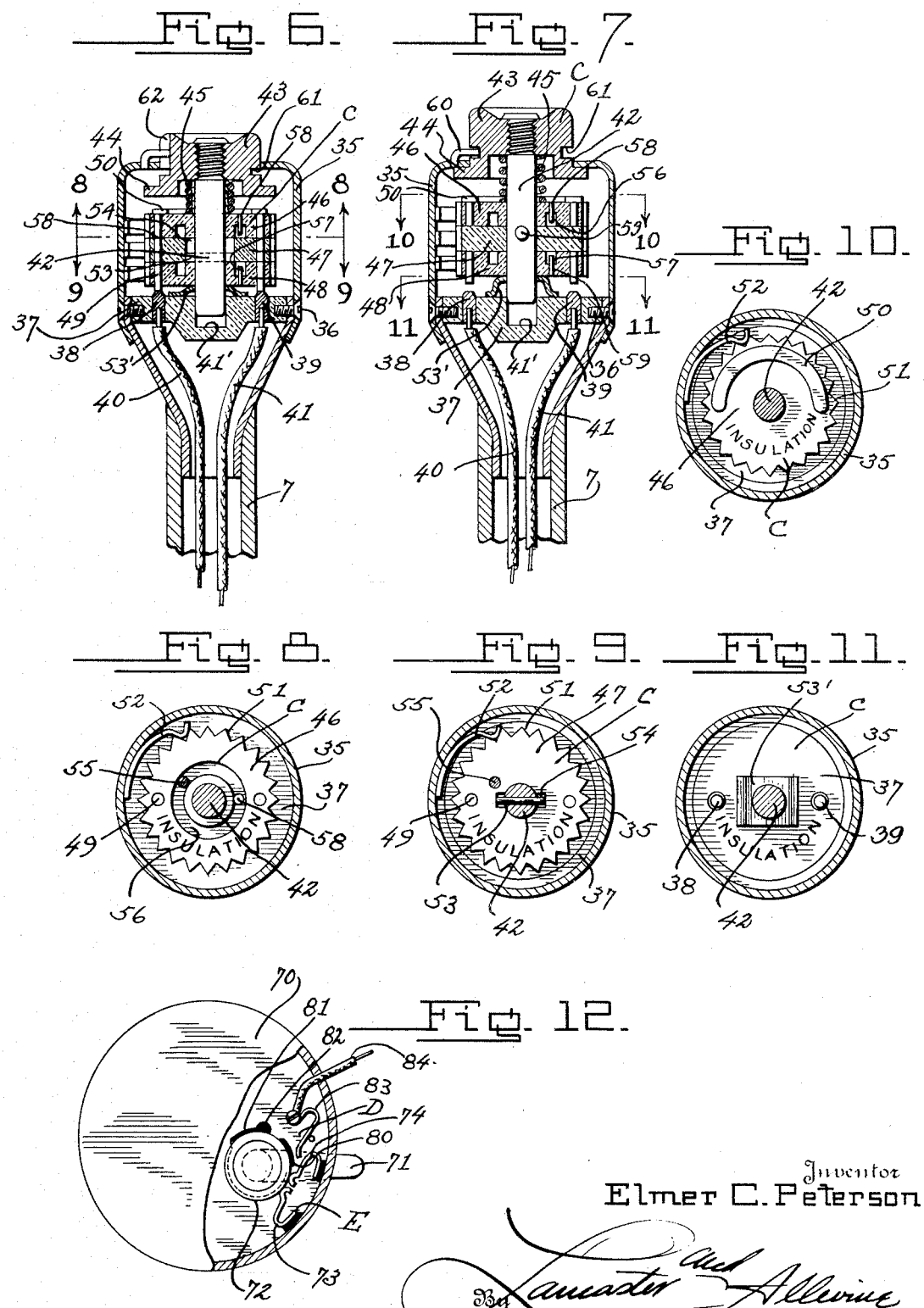

Patented Mar. 29, 1927.

1,622,839

UNITED STATES PATENT OFFICE.

ELMER CLYDE PETERSON, OF CLEVELAND, OHIO, ASSIGNOR, BY MESNE ASSIGNMENTS, TO THE MOTOBILE PRODUCTS COMPANY, OF CLEVELAND, OHIO, A CORPORATION OF OHIO.

VEHICLE LOCK.

Application filed June 9, 1922, Serial No. 567,231. Renewed August 26, 1926.

This invention relates to motor vehicles, and the primary object of the invention is to provide an improved and automatic means for locking the vehicle against operation when the same is not in use, so as to prevent the unauthorized use of said vehicle.

Another object of the invention is to provide means for automatically locking the vehicle against use when the ignition switch for the vehicle is operated, thereby insuring of the locking of the vehicle against unauthorized use, even though the driver of the vehicle should forget to lock the vehicle.

Another object of the invention is the provision of a novel lock for engaging the gear shifter rods or shafts of a selective gear transmission in order to prevent the actuation of the said transmission by unauthorized persons and thereby prevent the stealing of the vehicle.

A further object of the invention is the provision of a transmission lock incorporated with the transmission case and embodying locking pins for engaging the shifter slide rods or shafts and locking and unlocking magnetic coils for moving the pins into and out of engagement with the gear shift slide rods or shafts, the circuit for the locking coil being automatically closed upon the operation of the ignition switch lever for opening the circuit through the spark plugs, the circuit for the unlocking coil being controlled by a combination switch which can be located at any convenient point on the car.

A further object of the invention is to provide a novel means for mounting the improved combination switch for closing the circuit through the unlocking coil of the transmission lock with the gear shift lever, so as to form a compact structure thereby.

A still further object of the invention is to provide an improved transmission lock for motor vehicles of the above character, which will be durable and efficient in use, one that will be simple and easy to manufacture, and one which can be incorporated with a motor vehicle at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 6 is an enlarged vertical section through the upper end of the gear shift lever showing the improved combination lock incorporated therewith, the switch being in its actuated position for closing the circuit.

Figure 7 is a vertical section through the upper end of the gear shift lever, with the improved combination switch incorporated therewith showing the same in its non-circuit closing position.

Figure 8 is a horizontal section through the gear shift lever and switch, taken on the line 8—8 of Figure 6 and looking in the direction of the arrows.

Figure 9 is a section taken on the line 9—9 of Figure 6 looking in the direction of the arrows.

Figure 10 is a horizontal section through the gear shift lever taken on the line 10—10 of Figure 7 looking in the direction of the arrows.

Figure 11 is a vertical section through the gear shift lever and switch taken on the line 11—11 of Figure 7 and looking in the direction of the arrows.

Figure 12 is a fragmentary view partly in section of the vehicle ignition switch constructed in accordance with this invention.

Figure 1:
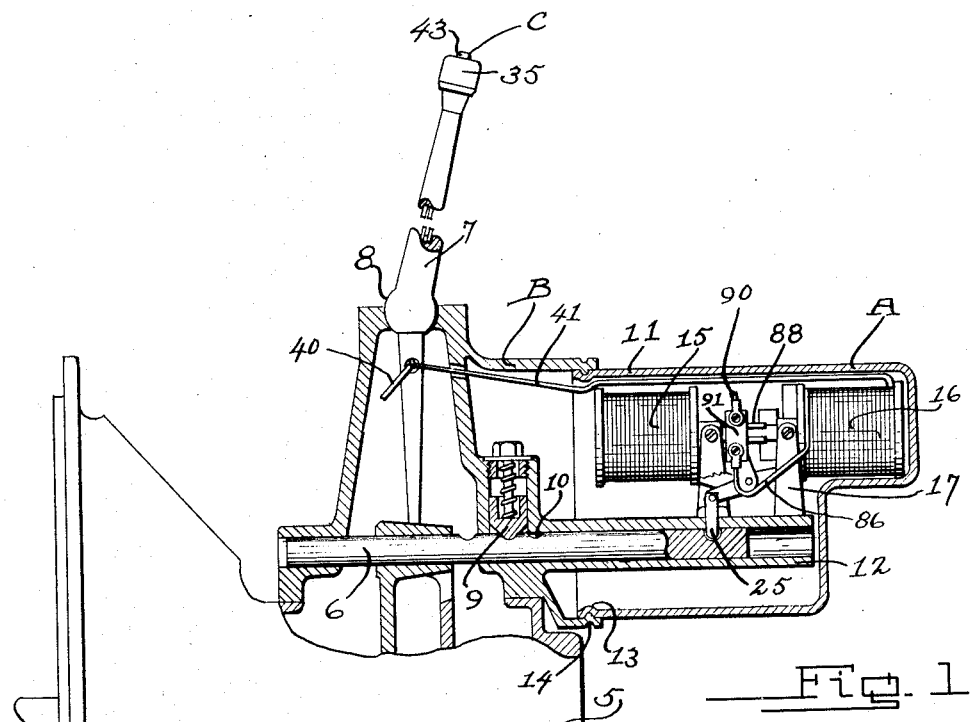
Figure 1 is a longitudinal vertical section through the improved lock, showing the same incorporated with a selective gear transmission.
Figure 13:
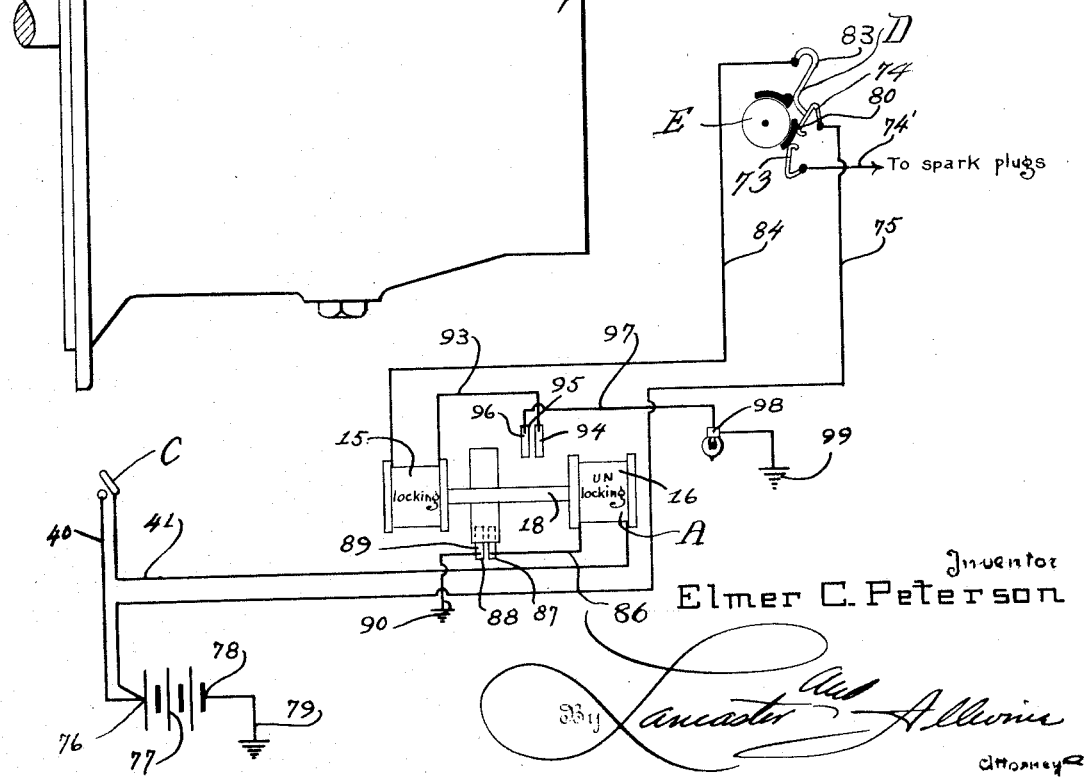
Figure 13 is a diagrammatic view of the wiring circuit of the improved lock.
Figure 2:
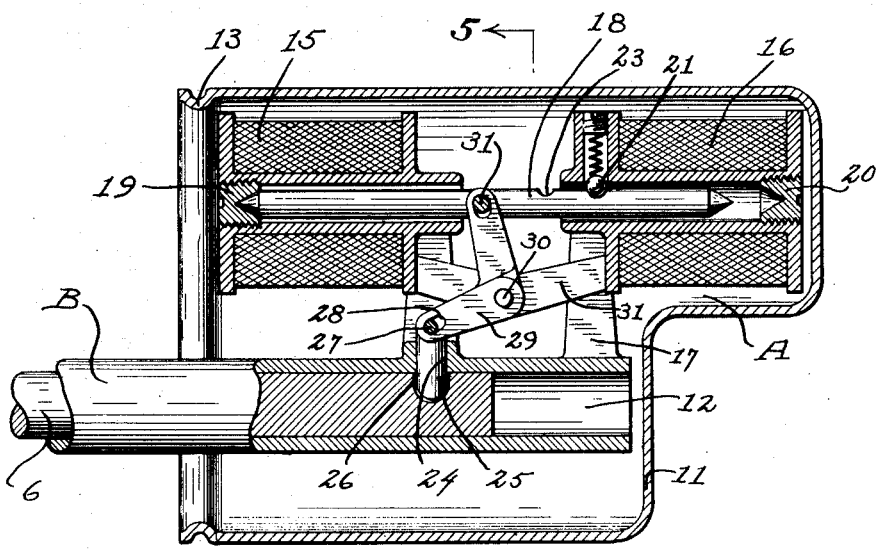
Figure 2 is an enlarged central longitudinal section through the improved lock, showing the locking pins in locking engagement with the shifter rods or shafts of the selective gear switch.

Referring to the drawings in detail, wherein similar reference characters designate corresponding parts throughout the several views, the letter A indicates the improved lock proper incorporated with a transmission gear shift B; C, the combination lock incorporated with the gear shift lever for controlling the circuit for causing the unlocking of the lock proper A; and D, the switch incorporated with the ordinary ignition switch E of the vehicle for causing the operation of the lock A.

The selective gear shift B is of the usual or any preferred character and includes the casing 5, the gear shifting rods or shafts 6 and the actuating gear shift lever 7. This gear shift lever 7 is connected, in the ordinary manner, as at 8, with the housing 5 and is operatively connected with the gear shift rods or shafts 6 in the usual way. The gear shift rods or shafts 6 are held against accidental movement by the usual spring pressed pawl 9 which is adapted to engage in spaced notches 10 formed directly in the said rods or shafts 6.

The improved lock A proper includes a casing 11 which is preferably formed of case hardened steel and connected in any preferred manner with the gear shift case 5. In actual practice, the case 11 can be formed integral with the case 5 if the lock is incorporated with the gear shift at the time of manufacture. As shown the shift rods or shafts 6 are of a sufficient length to extend within the casing 11 and suitable guide sleeves 12 are provided for the rods or shafts 6 which also extend into the casing 11. These guide sleeves 12 are rigidly connected to a part of the casing or housing 5 of the gear shift mechanism. If so desired, the open end of the casing 11 can be provided with a pressed in bead 13 for receiving an annular shoulder 14 formed on the gear shift housing or casing 5. Disposed within the case 11, are a pair of aligned electromagnets 15 and 16. The magnet 15 constitutes the locking magnet as will be hereinafter more fully described, while the electromagnet 16 constitutes the unlocking magnet as will be hereinafter more fully described. These magnets 15 and 16 can be secured in any preferred manner within the case 11, and as shown upstanding legs 17 are formed on the guide sleeves 12 and the coils are then secured to the said legs.

A single core 18 is provided for the electromagnets 15 and 16 and it can be seen that upon energizing of the coil 15, the core 18 will be drawn into the electromagnet 15 and upon energizing of the coil 16 the core 18 will be drawn into the coil 16. The electromagnets 15 and 16 are provided with stops 19 and 20 which can be threaded into the electromagnets varying distances to adjust the sliding movement of the core 18. Accidental sliding movement of the core 18 is prevented by the provision of a spring pressed pawl 21 which is adapted to rest in notches 23 formed in the core.

The guide sleeves 12 are provided with guide openings 24 for the locking pins 25 and these pins are adapted to fit within notches 26 formed in the gear shift rods or shafts 6 when the gear shift lever is in its neutral position. The locking pins 25 carry outstanding pivot pins 27 which are adapted to fit within slots 28 formed in the lower ends of bell cranks 29. These bell cranks 29 are pivoted at their angles by means of suitable pivot pins 30 to supports 31, which can be connected with the electromagnets 15 and 16. The upper ends of the bell cranks 29 are slotted for the reception of actuating pin 31 which is carried by the core 18 at a point equi-distant its ends. This pin also serves another important function, as will be hereinafter more fully described. It can be seen, however, that when the electromagnet 15 is energized and the core 18 is drawn into the same, the bell cranks 29 will be rocked, causing the forcing of the pins 25 into the notches 26 of the shifting rods or shafts 6, thereby preventing the actuation thereof. When the electromagnet 16 is energized, and the core 18 drawn into the same, the bell cranks 29 will be rocked in such a manner as to draw the locking pins upwardly and out of engagement with the rods or shafts 6 and thus permit the free operation thereof.

The locking coil 15 is controlled by the switch D, which is incorporated with the ignition switch E, while the unlocking coil is controlled by the combination switch C which is incorporated with the gear shift lever 7.

This combination switch C is disposed within a casing 35 which is secured by means of fastening elements 36 to the upper end of the gear shift lever 7. The lower end of the housing 35 supports a base plate of insulation 37 which also can be secured in position by means of the fastening element 36. This plate 37 supports contacts 38 and 39 which have connecting respectively thereto, the lead wires 40 and 41. The central portion of the base plate 37 is enlarged at its axial center and is provided with a socket 41' for receiving the operating stem 42, which is rotatably and slidably mounted therein. The upper end of the casing 35 rotatably and slidably supports the button 43, which is connected in any preferred way to the operating stem 42. The inner end of the button 43 is provided with an outstanding annular flange 44 which limits the upward movement of the button 43 within the casing 35. This button with the stem 42 is normally urged outwardly of the casing by means of an expansion spring 45 which is coiled about the stem 42 and engages the lower surface of the button 43. The lower end of the spring 45 engages the upper disc 46 of the combination switch. Disposed below the upper disc 46 is the intermediate operating disc 47 and arranged below the intermediate disc 47 is the lower disc 48. The discs 46, 47 and 48 are all formed of insulating material and each carry a pair of contacts 49 which when the switch is operated are adapted to be brought into alignment with one another and with the contacts 38 and 39, carried by the base plate 37 to close the circuit through the wires 40 and 41. The pairs of contacts 49 carried by the upper discs 46 are connected by a strip of conducting material 50. Each of these discs have their periphery provided with ratchet teeth 51 which are adapted to be engaged by springs 52 and as these discs are rotated, a clicking noise will be made, which will help to work the combination of the switch. All of the discs, with the exception of the intermediate disc 47 are slidably and rotatably mounted upon the stem 42 and the intermediate disc is mounted thereon in such a manner as to only have sliding movement on the stem. These discs are normally held in a raised position as shown in Figure 7 of the drawings by means of a leaf spring 53' which engages the lower disc 48 and the upper surface of the base plate 37. Thus, the pair of contacts 49 carried by the lower disc 48 will normally be held in a raised position out of engagement with the contacts 38 and 39 of the base plate 37. The stem 42 is provided with a diametrically extending pin 53, which engages in radially extending grooves 54 formed in the intermediate disc 47 and it can be seen that when movement is imparted to the stem 42 by means of the button 43, rotary movement of the intermediate disc 47 will be had. This intermediate or operating disc 47 is provided with an operating pin 55 which extends outwardly of the upper and lower faces of the disc 47 and has its opposite ends mounted respectively in annular grooves 56 and 57 formed respectively in the upper disc 46 and the lower disc 48. Stop pins 58 and 59 are carried by the discs 46 and 48 and are disposed within the annular grooves 56 and 57, and it can be seen that when the stem is turned, the operating pin 55 will engage the stop pins 58 and 59 for turning the discs 46 and 48 for permitting the aligning of all of the contacts 49 carried by all of said discs. An indicator 60, on the housing 35, cooperates with suitable graduations (not shown) on the button 43, said indicator normally operating in a peripheral groove 61 on the button and adapted to move into the vertical groove 62 when the button is depressed.

When it is desired to energize the unlocking coil to permit the operation of a gear shift the circuit is closed by means of the combination lock which is actuated in the following manner. The button 43 is first moved to the starting point, which will be indicated by indicator 60 pointing to a mark on the button 43. This button is then turned to the right a predetermined distance until one end of the operating pin 55 engages the stop pin 58 for moving the upper disc 46 to its correct position. The button is then turned to the left a predetermined distance until the lower disc 48 has been moved to its correct position by the lower end of the operating pin 55 engaging the stop pin 59. The button 43 is then turned to the right a predetermined distance which will align all of the contacts 49 of the discs as clearly shown in Figure 6 of the drawings. At this time the button 43 is pushed downwardly against the tension of the coil spring 45 and the leaf spring 53' which will force the lower contacts 49 of the disc 48 into engagement with the contacts 38 and 39, thus completing the circuit through the wires 40 and 41 through the contacts 38 and 39, the contacts 49 and the bridge piece 50. It can be seen that when pressure is released from the button 43, the same will automatically raise, thus breaking the circuit through the wires 40 and 41. These wires 40 and 41 are connected in a novel manner with the unlocking coil as will be hereinafter more fully described.

If desired, a detachable U-shaped clip 65 can be provided for normally holding the button 43 in its lowered position against the tension of the springs 45 and 50 so that the circuit will be closed through the wires 40 and 41 at all times which, in some instances will be desired. This clip can be of any preferred construction, but as shown simply includes means for engaging the button and semi-circular bands 66 for engaging around the shank of the lever 7 which will effectively prevent upward movement of the clip and consequent upward movement of the button 43.

Figure 5:
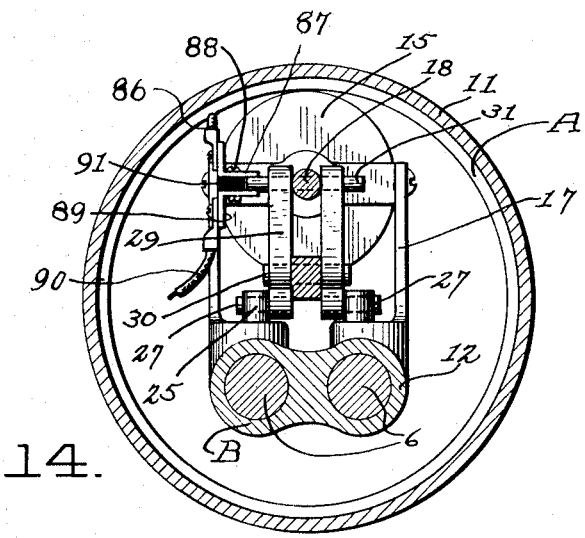
Figure 5 is a transverse section through the improved lock, taken on the line 5—5 of Figure 2, showing the same in its locked position.
Figure 14:
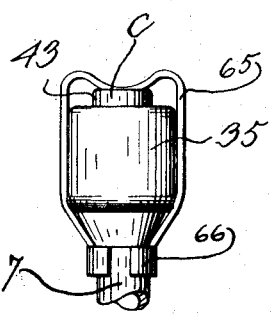
Figure 14 is a detail elevation of the upper end of the gear shift lever with the combination switch incorporated therewith showing the removable clip for holding the bottom of the switch in its lowered position.
Figure 3:
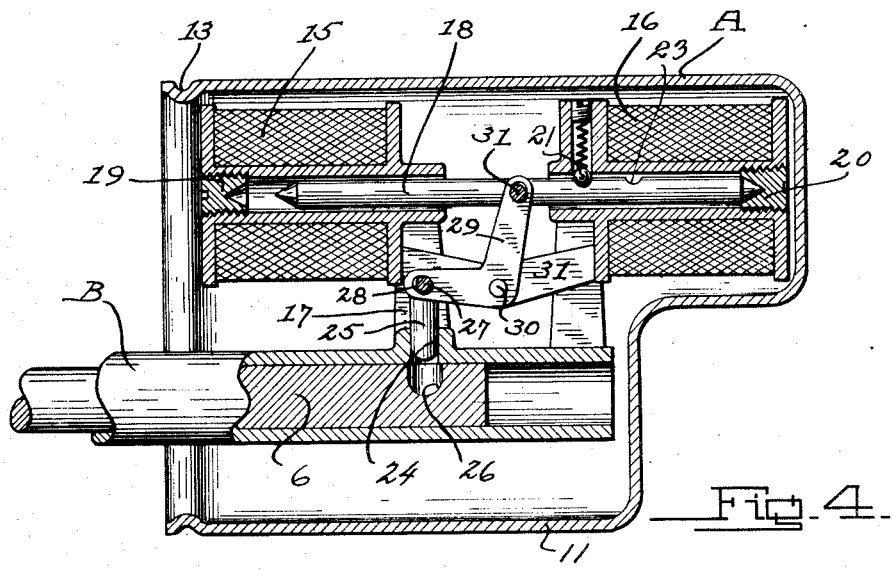
Figure 3 is a similar view, showing the locking pins in their raised or unlocking position in relation to the gear shift rods or shafts in order to permit the normal operation of the transmission.
Figure 4:
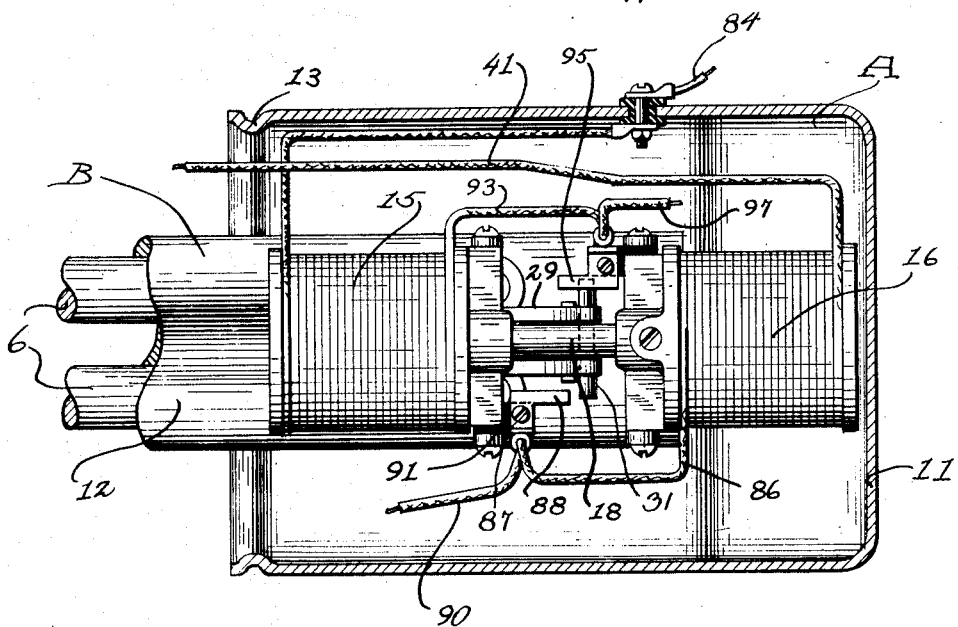
Figure 4 is a horizontal longitudinal section through the improved lock, showing the same in its unlocked position.

The switch D for controlling the locking coil 15 is as stated, incorporated with the ignition switch E and is automatically operated when the switch E turns to its off position. The ignition switch E is of the usual or any preferred construction and is mounted within the circular housing 70 which supports the actuating handle or button 71. This button or handle 71 is operatively connected to the conducting disc 72 which is adapted to bridge a pair of spaced contacts 73 and 74. One of these contacts has electrically connected thereto a lead wire 74' which leads to the spark plugs, while the other contact 74 has electrically connected thereto the lead wire 75 which leads to the positive terminal 76 of the storage battery 77, the negative terminal 78 of which is grounded by means of a wire 79. This conducting disc 72 has secured thereto a plate of insulation 80 which, when the disc is turned, is adapted to be brought into engagement with the contacts 73 and 74 for opening the circuit therethrough. A second plate of insulation 81 is formed on the conducting disc 72 and this plate of insulation is provided with an outwardly extending tit 82, which is adapted to engage the conducting spring 83 when the plate of insulation 80 is in engagement with the contacts 73 and 74. The conducting spring 83 with the plate of insulation 81 and its tit 82 forms the switch D. This spring contact 83 is so disposed that the tit 82 will engage the same and move it into contact with the contact 74 for closing the circuit through the wire 75 and a wire 84, which is electrically connected with the spring contact 83. Now the wires 40, 41 and 84 are electrically connected with the coils 15 and 16 in the following manner. The lead wire 41 extending from the combination switch C is connected with one terminal of the unlocking coil 16, while the wire 40 is electrically connected to the positive terminal 76 of the storage battery 77. The other terminal of the unlocking coil 16 has electrically connected thereto a lead wire 86. This lead wire 86 is electrically connected to one contact 87 of a pair of contacts 88, the other contact 89 of which is grounded to the case 11 of the coils as by a wire 90. The contacts 87 and 89 are held in spaced relation by means of an insulating block 91 which can be secured in any preferred manner to one of the coils. The space between the contacts 87 and 89 is closed when the pin 31 rides between the same as shown in Figure 5 of the drawings. The pin 31 will be in position for engaging the contacts 87 and 89 when the locking coil 15 has been energized for drawing the core or rod 18 into the same. The wire 84 from the switch D is electrically connected to one terminal of the locking coil 15 and the other terminal of the locking coil 15 has electrically connected thereto a lead wire 93 which connects with one contact 94 of a pair of contacts 95. The other contact 96 of the pair of contacts 95 has electrically connected thereto a lead wire 97 which can lead to one terminal of an indicating lamp or horn 98, the other terminal of which is grounded as at 99. If an indicating lamp is used, instead of the horn 98, the same can be placed at a convenient point on the dash board of the vehicle and this light or horn is utilized for indicating when the gear shift is not in neutral position when the driver cuts off the ignition to his machine as will be now described.

In operation of the improved device, when the ignition lever is actuated for opening the circuit through the spark plugs, the contact 83 will be brought into engagement with the contact 74 as hereinbefore described, and the current will flow from the battery 77 through the wire 75, the contact 74, the contact 83, the wire 84, through the coil 15, the wire 93 through the pair of contacts 95 and the pin 31 through the light or horn 98 to the ground 99 back through the battery 77. This will cause the energizing of the magnet 15 which will draw over its armature core 18 engage the pin 31 with the pair of contacts 88 and thus rock the bell cranks 29 and push downward on the pins 25, forcing the same into the notches 26 in the gear shift rods or shafts 6 and thus automatically lock the same. Owing to the fact that the coil 15 will at once draw over the core 18, the sounding of the horn or the lighting of the light 98 will only be momentarily, but if the operator of the machine has forgotten to move the gear shift to neutral position, the pins 25 will be prevented from going into the notches 26, and thus the pin 31 will be held into engagement with the pair of contacts 95, thus completing the circuit through the horn or light 98, causing the continuous lighting or sounding thereof, thus indicating to the operator that he has not moved the gear shift lever to neutral position.

When it is desired to start the car, the combination switch C is actuated in the manner heretobefore described, for closing the circuit through the wires 40 and 41. This will cause the energizing of the unlocking coil 16, which will draw the core 18 into the same, causing the rocking movement of the bell cranks 29. The rocking movement of the bell cranks 29 will lift the locking pins 25 from out of the notches 26, thus allowing the free operation of the gear shift rods or shafts 6 by the gear shift lever 7 when so desired.

From the foregoing description, it can be seen that a novel gear shift lock has been provided, which will be automatically operated upon the opening of the ignition circuit, but which cannot be operated for unlocking the gear shift lever until the combination lock has been operated.

Changes in details may be made without departing from the spirit or scope of this invention; but,

I claim:

1. The combination with a motor vehicle, a movable operating portion, and an ignition switch, of a lock including locking pins, an electromagnet for operating said pins, the pins being adapted to be forced into engagement with the movable portion of the vehicle for preventing the actuation thereof, and means for closing the circuit through the electromagnet upon the opening of the ignition circuit by said switch.

2. The combination with a motor vehicle including a movable operating portion, and a switch for controlling the ignition circuit of a vehicle, of a lock including sliding locking pins for engaging the movable portion of the vehicle to prevent operation thereof, an electromagnet for moving the pins into engagement with the said movable portion of the vehicle, means for closing a circuit through an electromagnet upon the actuation of said switch for opening the circuit through the ignition system of the vehicle and a second electromagnet causing the operation of said pins to move the same from out of engagement with the movable portion of the vehicle.

3. The combination with a motor vehicle including gear shifting rods, and an ignition switch for the ignition system of the motor vehicle, of a lock for the gear shifting rods including movable locking pins, an electromagnet for actuating said pins for moving the same into locking engagement with said rods, means for closing the circuit through said electromagnets upon the operation of said switch for opening the ignition circuit, a second electromagnet for actuating said pins for moving the same from out of engagement with the gear shifting rods, and a combination electric switch for closing the circuit through said second electromagnet for permitting the unlocking of the vehicle.

4. In a lock for motor vehicles, the combination with the ignition switch of a motor vehicle and the gear shifting rods, of a pair of aligned electromagnets, a single sliding core for the magnets, locking pins for engagement with the rods, bell cranks operatively connecting the locking pins with the core of the electromagnets, one of said electromagnets constituting the means for causing the moving of the pins into engagement with the gear shifting rods, and the other magnet forming the means for causing the pins to be moved out of engagement with said rods, means for closing the circuit through the electromagnets for moving the pins in engagement with the rods by the actuation of said ignition switch for opening the ignition circuit of the vehicle, and a permutation electric switch for controlling the closing of the circuit through the other magnet.

5. In a lock for motor vehicles, the combination with the gear shift rods of the vehicle gear shift, and the ignition switch for controlling the opening and closing of the ignition circuit, of a lock including a pair of aligned electromagnets, a single sliding core for said magnet, locking pins for engaging the shifting rods for preventing unauthorized movement thereof, bell cranks operatively connecting the pins with the core, means for closing a circuit through one of the electromagnets upon the actuation of the ignition switch for opening an ignition circuit causing the movement of said pins into engagement with the shifting rods, a permutation switch for controlling the circuit of the other magnet for causing the movement of said pins from out of engagement with the gear shift rods, and means for preventing the accidental movement of said core.

6. In a vehicle lock, the combination with a selective gear set including a casing and sliding gear shifting rods, and a switch for controlling the ignition circuit of the vehicle, of a lock including a casing connected with the gear casing and communicating therewith, the gear shifting rods extended into the last mentioned casing, a pair of aligned electromagnets mounted in the last mentioned casing, a single sliding core for said magnet, sliding locking pins for engaging the gear shift rods to prevent movement thereof, pivoted bell cranks operatively connecting the pins with the core, means controlling the circuit of one of the electromagnets by movement of the ignition switch, and a permutation switch associated with the gear shift lever for controlling the energizing of the other magnet.

7. In a motor vehicle lock, the combination with a selective gear set including a casing, gear shifting rods, and an operating lever, and an ignition switch for controlling the ignition circuit of the vehicle, of a lock for the gear shift lever including a casing connected to and communicating with the casing of the selective gear shift, the gear shift rods being extended into the casing of the lock, tubular guides for the rods extending into the lock casing, sliding pins supported by the guides, the gear shift levers having notches formed therein for receiving said pins, a pair of aligned electromagnets disposed within the lock casing and a sliding core for said electromagnets, pivoted bell cranks operatively connecting the core with said sliding pins, one of said electromagnets constituting the means for forcing the pins into engagement with the gear shift rods when the same are in neutral position, the other electromagnet constituting means for moving the pins from out of engagement with the gear shift rods, means for engaging the core for preventing accidental movement thereof, and means for independently energizing the electromagnets.

8. In a motor vehicle lock, the combination with a selective gear set including a casing, gear shifting rods, and an operating lever, an ignition switch for controlling the ignition circuit of the vehicle, of a lock for the gear shift lever including a casing connected to and communicating with the casing of the selective gear shift, the gear shift rods being extended into the casing of the lock, tubular guides for the rods extending into the lock casing, sliding pins supported by the guides, the gear shift levers having notches formed therein for receiving said pins, a pair of aligned electromagnets disposed within the lock casing, and a sliding core for said electromagnet, pivoted bell cranks operatively connecting the core with said sliding pins, one of said electromagnets constituting the means for forcing the pins into engagement with the gear shift rods when the same are in neutral position, the other electromagnet constituting means for moving the pins from out of engagement with the gear shift rods, means for engaging the core for preventing accidental movement thereof, means for independently energizing the electromagnets, and means for actuating a signal upon the energizing of one of the magnets for moving the pins into locking engagement with the rods when the rods have not been moved to neutral position.

9. The combination with a motor vehicle including a selective gear shift having a casing, a pair of gear shifting rods, an operating lever, and an ignition switch for controlling the ignition circuit of the vehicle, of a lock including a lock casing connected with the gear casing, the gear shift rod being extended into the lock casing and having notches formed therein, sliding locking pins for engagement in said notches to prevent shifting movement of the rods when the selective gear set is in neutral position, a pair of aligned electromagnets for causing the movement of said pins into and out of engagement with said notches, means for controlling the circuit for one of said magnets by the operation of the ignition switch, and a permutation switch carried by the gear shift lever for controlling the circuit of the electromagnet, said permutation switch including a plurality of rotatable discs carrying pairs of contacts, a base plate having a pair of contacts embedded therein, and means for operating said discs and for forcing the contacts of the discs into engagement with the stationary contacts carried by the base plate.

10. In a motor vehicle, the combination of a selective gear set including gear shift rods and an ignition control switch for the ignition circuit of the vehicle including a pair of resilient contacts and a movable conducting disc, a resilient contact disposed adjacent to one of the mentioned contacts, a strip of insulation carried by the conducting disc for engagement with the pair of first mentioned contacts, means carried by the conducting disc for forcing the resilient contact into engagement with one of the mentioned contacts when the insulating strip on the conducting disc is moved into engagement with the said pair of contacts, of a lock including a pair of aligned electromagnets, a single sliding core for said magnets, sliding locking pins for engagement with the gear shifting rods, bell cranks for operatively connecting the pins with the core, an electric circuit including a battery, a wire connecting one of the contacts of the pair of contacts with the battery, means for grounding the other terminal of the battery, means for connecting the resilient contact with the terminal of one of the magnets, means for grounding the other terminal of the mentioned electromagnet, and means for controlling the circuit of the other electromagnet.

11. In a lock for motor vehicles, a pair of aligned electromagnets, a sliding core for the electromagnets including a conducting pin, locking pins for engaging a movable portion of a motor vehicle for preventing actuation thereof, pivoted bell cranks operatively connecting the core with the locking pins, pairs of spaced contacts carried by and insulated from the electromagnets, the conducting pins carried by the core being adapted to engage one pair of contacts when the core is in one position and adapted to engage the other pair of contacts when the core is in another position, a switch for controlling one of said magnets including a resilient contact and a stationary contact, means for forcing the resilient contact into engagement with the stationary contact, a permutation switch for controlling the circuit of the other magnet including a pair of contacts, means for operatively connecting the resilient contacts of the first mentioned switch with one terminal of one coil, means electrically connecting the other terminal of the mentioned coil with one contact of one pair of contacts, means grounding the other contact with the mentioned pair of contacts, a signal in said grounding means, a storage battery, means electrically connecting the stationary contact with one terminal of the source of electrical energy, means for grounding the other terminal of the source of electrical energy, means for electrically connecting one of the rigid contacts of the permutation switch with one terminal of the other electromagnet, means electrically connecting the other terminal of the last mentioned magnet with one contact of the other pair of contacts, and means for connecting the other rigid contact of the permutation switch with one terminal of the source of electrical energy.

ELMER CLYDE PETERSON.